(12) United States Patent
Sharma et al.

(10) Patent No.: US 7,672,682 B2
(45) Date of Patent: Mar. 2, 2010

(54) MANAGING PAGE CYCLE PERIODS OF ACCESS TERMINALS

(75) Inventors: Vivek Sharma, Chelmsford, MA (US);
Sundar Raman, Westford, MA (US);
Rayadurgam Ravikanth, Acton, MA (US); Gopal Harikumar, Westford, MA (US); Woojune Kim, Arlington, MA (US); Srinivas Kappla, Nashua, NH (US); Satish Grandhi, Carlisle, MA (US)

(73) Assignee: Airvana, Inc., Chelmsford, MA (US)

( * ) Notice: Subject to any disclaimer, the term of this patent is extended or adjusted under 35 U.S.C. 154(b) by 727 days.

(21) Appl. No.: 11/392,230

(22) Filed: Mar. 28, 2006

(65) Prior Publication Data

US 2007/0238476 A1 Oct. 11, 2007

(51) Int. Cl.
H04Q 7/20 (2006.01)
H04B 1/16 (2006.01)
H04B 1/38 (2006.01)

(52) U.S. Cl. ............ 455/458; 455/574; 455/343.1

(58) Field of Classification Search ......... 455/412.1, 455/412.2, 414.1, 458, 574, 343.2, 343.5, 455/571, 572, 573, 343.1, 343.4, 343.6, 550.1; 370/311

See application file for complete search history.

(56) References Cited

U.S. PATENT DOCUMENTS

| | | | | |
|---|---|---|---|---|
| 5,889,770 A | * | 3/1999 | Jokiaho et al. | 370/337 |
| 6,216,004 B1 | * | 4/2001 | Tiedemann et al. | 455/442 |
| 6,240,288 B1 | * | 5/2001 | Wan et al. | 455/426.1 |
| 6,289,227 B1 | * | 9/2001 | Shi | 455/574 |
| 6,650,912 B2 | * | 11/2003 | Chen et al. | 455/574 |
| 6,711,144 B1 | | 3/2004 | Kim et al. | |
| 6,731,618 B1 | | 5/2004 | Chung et al. | |
| 6,741,862 B2 | | 5/2004 | Chung et al. | |
| 6,781,999 B2 | | 8/2004 | Eyuboglu et al. | |
| 6,990,362 B2 | * | 1/2006 | Simpson et al. | 455/574 |
| 7,170,871 B2 | | 1/2007 | Eyuboglu et al. | |
| 7,194,261 B2 | * | 3/2007 | Emeott et al. | 455/426.2 |
| 7,200,391 B2 | | 4/2007 | Chung et al. | |
| 7,242,958 B2 | | 7/2007 | Chung et al. | |
| 7,269,145 B2 | * | 9/2007 | Koo et al. | 370/311 |
| 7,277,446 B1 | | 10/2007 | Abi-Nassif et al. | |

(Continued)

FOREIGN PATENT DOCUMENTS

GB 2452688 3/2009

OTHER PUBLICATIONS

Paul Bender, et al., "CDMA/HDR: A Bandwidth-Efficient High-Speed Wireless Data Service for Nomadic Users", IEEE Communications Magazine, Jul. 2000.

(Continued)

Primary Examiner—Tilahun Gesesse
(74) Attorney, Agent, or Firm—Fish & Richardson P.C.

(57) ABSTRACT

In a radio access network, techniques for determining how often an aces terminal in communication with the network is to monitor a channel of the network based on trigger information received from the access terminal that is specific to one or more of the following: a state of the terminal, a state of a premium application, and a user of the terminal. The trigger information includes information about one or more of the following: a power mode of the access terminal, a user profile identification, an activation of a premium application on the terminal, and a terminal of a premium application on the terminal.

23 Claims, 2 Drawing Sheets

U.S. PATENT DOCUMENTS

| | | | |
|---|---|---|---|
| 7,292,545 B2* | 11/2007 | Maki et al. | 370/311 |
| 7,299,278 B2 | 11/2007 | Ch'ng | |
| 7,324,468 B2* | 1/2008 | Fischer | 370/311 |
| 7,406,342 B2* | 7/2008 | Kim | 455/574 |
| 7,433,670 B2* | 10/2008 | Benveniste | 455/343.2 |
| 7,551,568 B2* | 6/2009 | Jeong et al. | 370/252 |
| 2002/0196749 A1 | 12/2002 | Eyuboglu et al. | |
| 2003/0100311 A1 | 5/2003 | Chung et al. | |
| 2004/0106441 A1* | 6/2004 | Kazakevich et al. | 455/574 |
| 2005/0036464 A1* | 2/2005 | Rajkotia et al. | 370/336 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0076643 A1* | 4/2007 | Yang et al. | 370/310 |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0197234 A1* | 8/2007 | Gill et al. | 455/458 |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |

OTHER PUBLICATIONS

Paul Bender & Ramin Rezalifar, "Draft Baseline Text for the 1xEV-DO Upper Layers (excluding Physical Layer)", 3GPP2, Aug. 17, 2000.

3GPP2, "3GPP2 Access Network Interfaces Interoperability Specification 2, Release A," Jun. 2000.

TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.

3rd Generation Partnership Project "3GPP2", cdma High Rate Packet Data Interface Specification, C.S0024-A, version 4.0, Oct. 25, 2002.

3rd Generation Partnership Project "3GPP2", cdma High Rate Packet Data Interface Specification, C.S0024-A, version 1.0, Mar. 2004.

3rd Generation Partnership Project "3GPP2", cdma High Rate Packet Data Interface Specification, C.S0024-A, version 2.0, Jul. 2005.

All-IP Core Network Multimedia Domain, 3GPP2 X.S0013-000-0, version 1, Dec. 2003, http://www.3gpp2.org/.

All-IP Core Network Multimedia Domain, 3GPP2 X.S0013-000-0, version 2, Jul. 2005, http://www.3gpp2.org/.

Service Requirements for the Internet Protocol (IP) Multimedia Core Network Subsystem, 3GPP TS 22.228, http://www.3gpp.org/, Sep. 2006.

Broadcast and Multicast Service in cdma2000 Wireless Network, 3GPP2 X.S0022-0, http://www.3gpp2.org/, Feb. 16, 2007.

Multimedia Broadcast/Multicast Service (MBMS); Architecture and Functional Description, 3GPP TS 23.846, http://www.3gpp.org/, Dec. 2002.

IP Multimedia Subsystem, Stage 2, 3GPP TS 23.228, http://www.3gpp2.org/, Dec. 2003.

SIP: Session Initiation Protocol, IETF RFC 3261, http://www.ietf.org/, Jun. 2002.

SDP: Session Description Protocol, IETF RFC 2327, http://www.ietf.org/, Apr. 1998.

Remote Authentication Dial In User Service (RADIUS), IETF RFC 2865, http://www.ietf.org/, Jun. 2000.

Diameter Base Protocol, IEFT RFC 3588, http://www.ietf.org/, Sep. 2003.

http://www floforum.org, Feb. 19, 2009.

http://www dvb.org, Feb. 19, 2009.

* cited by examiner

MANAGING PAGE CYCLE PERIODS OF ACCESS TERMINALS

TECHNICAL FIELD

This description relates to managing page cycle periods of access terminals.

BACKGROUND

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1×EV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1×) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocol" Jun. 6, 2000, and TIA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking advantage of the scalability, redundancy and low-cost of IP networks.

An EVolution of the current 1×RTT standard for high-speed data-only (DO) services, also known as the 1×EV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification," 3GPP2 C.S0024-A, Version 2.0, June 2005, and is also incorporated herein by reference.

FIG. 1 shows a 1×EV-DO radio access network 100 with a radio node controller 102 connected to radio nodes 104a, 104b over a packet network 106. The packet network 106 can be implemented as an IP-based network that supports many-to-many connectivity between the radio nodes 104a, 104b and the radio node controller 102. The packet network 106 is connected to the Internet 110 via a packet data serving node 108. Other radio nodes, radio node controllers, and packet networks (not shown in FIG. 1) can be included in the radio access network 100.

Access terminals 112 communicate with the radio nodes of the network 100 over airlinks 120. Each access terminal 112 may be a laptop computer, a Personal Digital Assistant (PDA), a dual-mode voice/data handset, or another device, with built-in 1×EV-DO support. The airlink 120 between the network 100 and an access terminal 112 includes a control channel over which the network 100 transmits messages and parameters that the access terminal 112 may need for access and paging operations. The messages and parameters convey system parameters, access parameters, neighbor lists, access terminal-directed paging messages, access terminal-directed orders, and channel assignment information to the access terminal 112.

When there is no call actively in progress and the access terminal 112 has a session 1×EVDO established on a radio node controller (e.g., radio node controller 102) of the network 100, the access terminal 112 is said to be in a dormant state. An access terminal 112 in a dormant state can go to sleep (i.e., shut down unnecessary functions) and periodically wake up to monitor the control channel for access terminal-directed paging messages. The frequency at which the access terminal 112 wakes up to monitor the control channel is referred to as the "page cycle period." As battery power is consumed each time the access terminal 112 wakes up, a good page cycle period is one that conserves battery power while ensuring that the access terminal 112 promptly receives all paging messages transmitted on the control channel.

SUMMARY

In one aspect, the invention features a method including determining how often an access terminal in communication with a radio access network is to monitor a channel of the network based on trigger information received from the access terminal that is specific to one or more of the following: a state of the terminal, a state of a premium application, and a user of the terminal.

Implementations of the invention may include one or more of the following. The method further includes selecting a page cycle period value based on the trigger information. The method further includes sending a message to the access terminal, the message including a page cycle period value at which the access terminal is to monitor the channel of the network.

The trigger information that is specific to a state of the terminal includes information about a power mode of the access terminal. The power mode includes a first power mode in which the first access terminal draws power from a first power source, and a second power mode in which the first access terminal draws power from a second power source. The first power source provides limited power. The second power source provides unlimited power.

The trigger information that is specific to a user of the terminal includes a user profile identification. Based on the user profile identification, the method further includes determining user conditions associated with a page cycle period of the access terminal. The conditions include rule-based conditions and preference-based conditions. The method of determining user conditions includes retrieving, from a data store, a user profile corresponding to the user profile identification, wherein the user profile comprises one or more of the following: a role of the user, scheduling information, demographic information, and location information.

The trigger information that is specific to a state of a premium application includes information identifying an activation or a termination of a premium application on the terminal. The premium application is associated with specific quality of service requirements.

In another aspect, the invention features a method including receiving from a user of an access terminal information indicating that a frequency with which the access terminal monitors a channel of the network is to be changed.

Implementations of the invention may include one or more of the following. The method further includes communicating the information to a network. The information is indicated by a key press on the access terminal. Repeated key press toggles the information among two or more different indications.

In another aspect, the invention features a machine-readable medium that stores executable instructions for use at a radio node controller of a radio access network, the instructions causing a machine to determine how often an access terminal in communication with a radio access network is to monitor a channel of the network based on trigger information received from the access terminal that is specific to one or more of the following: a state of the terminal, a state of a premium application, and a user of the terminal.

Implementations of the invention may include one or more of the following. The machine-readable medium further includes instructions to cause the machine to select a page cycle period value based on the trigger information. The trigger information includes information about one or more of the following: a power mode of the access terminal, a user profile identification, an activation of a premium application on the terminal, and a terminal of a premium application on the terminal.

In another aspect, the invention features an apparatus including a processor, and memory, including software to provide instructions to the processor to determine how often an access terminal in communication with a radio access network is to monitor a channel of the network based on trigger information received from the access terminal that is specific to one or more of the following: a state of the terminal, a state of a premium application, and a user of the terminal.

Implementations of the invention may include one or more of the following. The instructions to the processor further includes instructions to select a page cycle period value based on the trigger information. The trigger information includes information about one or more of the following: a power mode of the access terminal, a user profile identification, an activation of a premium application on the terminal, and a termination of a premium application on the terminal.

Advantages of particular implementations may include one or more of the following. By managing an access terminal's page cycle period(s), battery power can be conserved while ensuring that the dormant access terminal receives all of its paging messages in a timely fashion. The page cycle period for a given dormant access terminal running premium applications can be optimized so as to meet or exceed the quality of service requirements associated with the premium applications without unnecessarily draining the battery power of the access terminal. In certain cases, the network need not buffer much data due to the short page cycle periods.

Other features and advantages will be apparent from the description and the claims.

DETAILED DESCRIPTION

Figure 1:
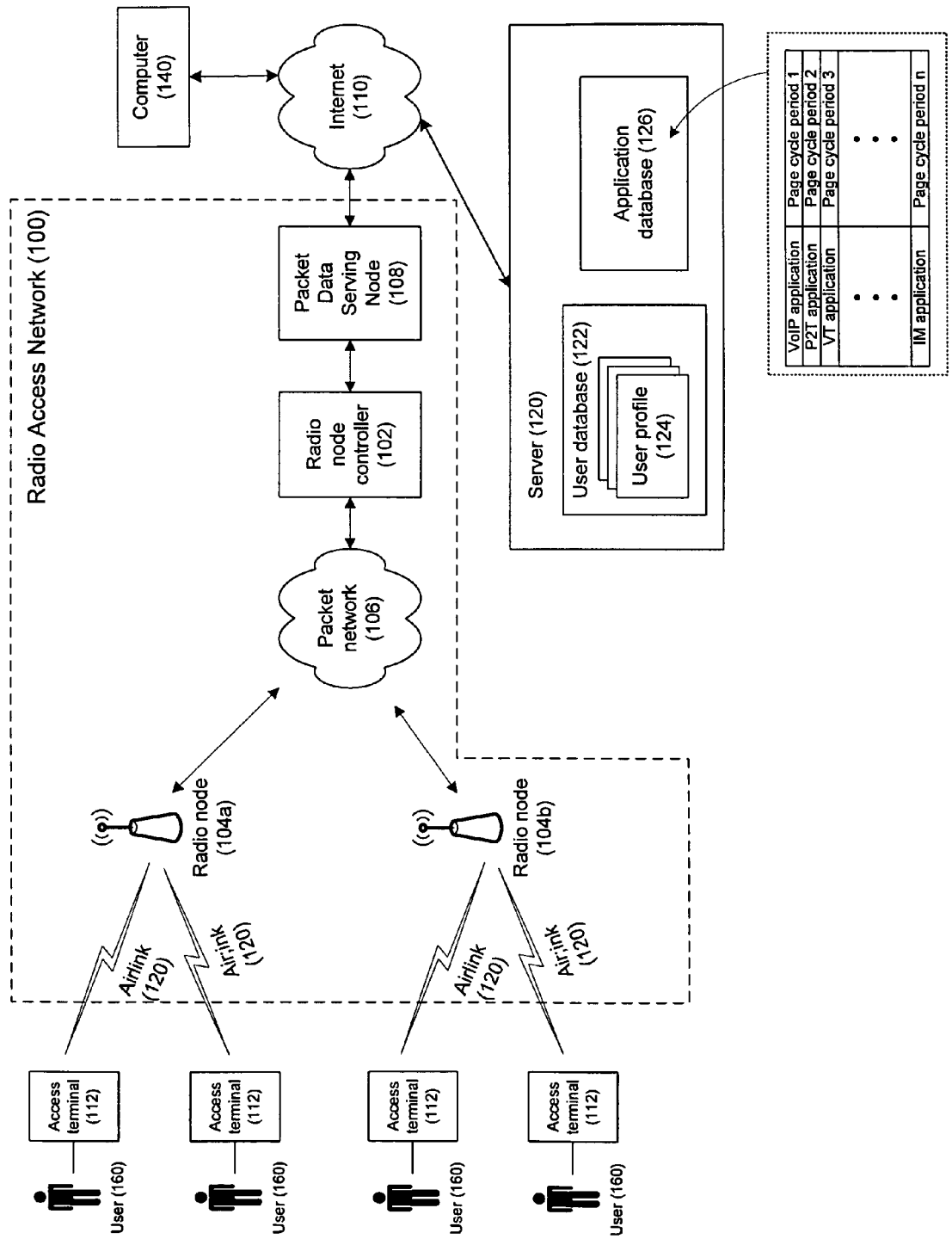
FIG. 1 shows a radio access network.

In some implementations, the access terminals 112 in communication with the 1×EV-DO radio access network 100 of FIG. 1 support a slotted-mode operation in which the page cycle periods of an access terminal 112 in a dormant state are selected based on one or more triggers. Examples of three triggers are described below.

Power Connectivity Trigger

Figure 2:
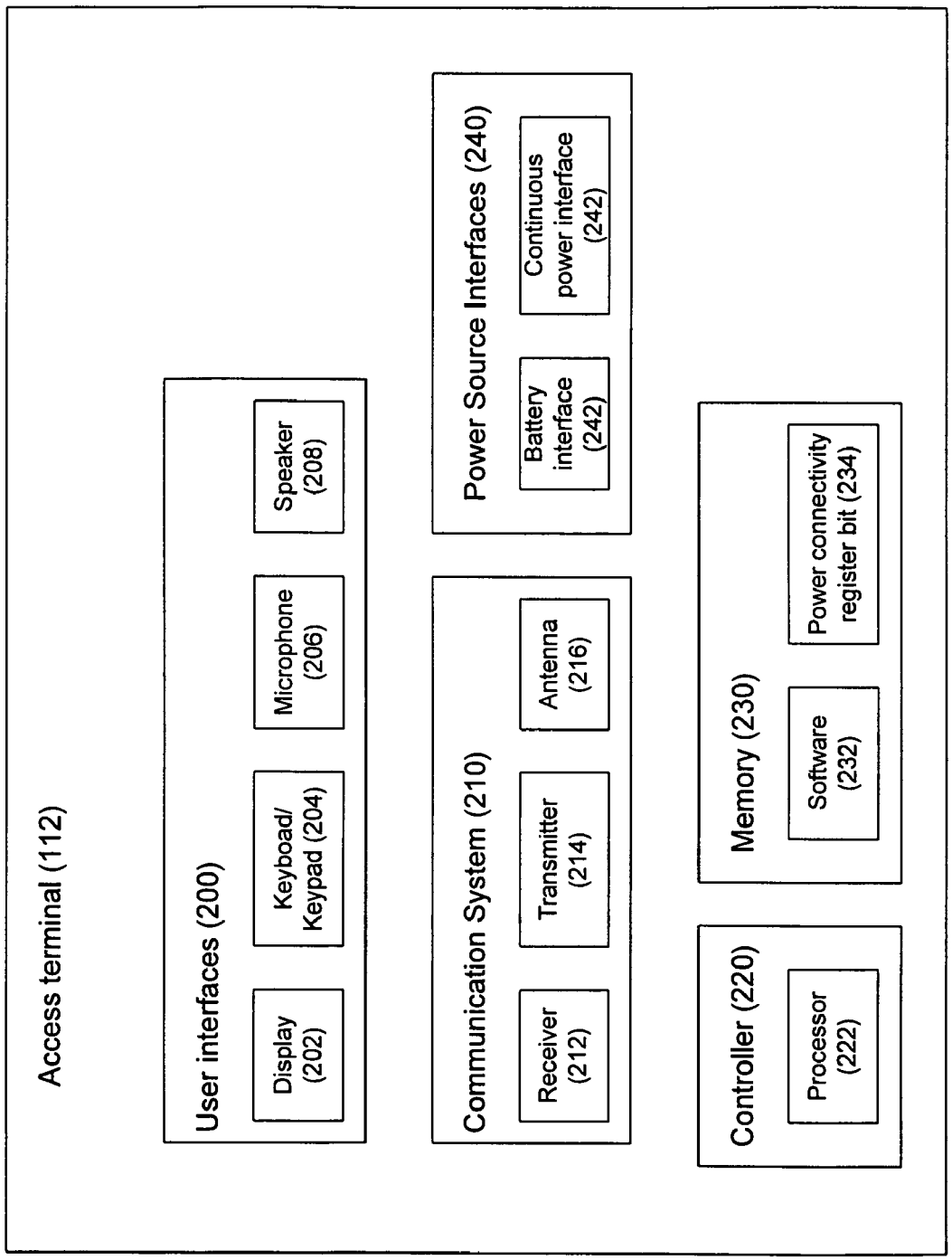
FIG. 2 shows a block diagram of an access terminal.

In FIG. 2, an access terminal 112 includes user interfaces 200 (e.g., a display 202, a keyboard/keypad 204, a microphone 206, and a speaker 208), a communications system 210 (e.g., a receiver 212, a transmitter 214, an antenna 216), and a controller 220. The controller 220 includes a processor 222 that runs software 232, stored in a memory 230, to control the overall operation of the access terminal 112. The communication functions, including data communications, are performed by the communications system 210.

The access terminal 112 also includes power source interfaces 240. One power source interface is a battery interface 242 adapted to receive a battery that can provide power to the access terminal 112 for a limited period of time. A second power interface is a continuous power interface 244 adapted to receive a connector to an external power source that can provide power to the access terminal 112 for an unlimited period of time. Other power source interfaces (not shown) can be included in the access terminal 112.

The access terminal 112 can operate in one of two power connectivity modes. In a "standalone" mode, the access terminal 112 draws power solely from a battery. In a "connected" mode, the access terminal 112 draws power solely from an external power source, even when a battery is coupled to the access terminal 112. In some implementations, the controller 220 uses a register bit ("power connectivity register bit" 234) to track the power connectivity mode in which the access terminal 112 is currently operating. For example, a register bit of 0 indicates operation in the standalone mode, and a register bit of 1 indicates operation in the connected mode.

Each time the access terminal 112 switches between power connectivity modes while the access terminal 112 is in the dormant state, the controller 220 flips the power connectivity register bit 234. Suppose, for example, the controller 220 sets the register bit to 0 indicating that the access terminal 112 is operating in the standalone mode.

In some implementations, the access terminal 112 sends a signaling message that includes a paging cycle attribute value corresponding to the standalone mode. Upon receipt of the signaling message, the network 100 identifies a page cycle period value corresponding to the standalone mode paging cycle attribute value and returns a message including the identified page cycle period value to the access terminal 112. The access terminal 112 sets the value of the page cycle period to the identified value provided in the message returned by the network 100 and monitors the control channel in accordance with the newly-set page cycle period.

In some implementations, the access terminal 112 has a set of predetermined page cycle period values stored in its memory 230, where each page cycle period value is associated with a paging cycle attribute value. When the controller 220 flips the power connectivity register bit 234, the access terminal 112 retrieves from the memory 230 the page cycle period value ("proposed page cycle period value") associated with the standalone mode paging cycle attribute value and sends a signaling message including the proposed page cycle period value to the network 100. In some examples, the network 100 examines the proposed page cycle period value provided in the signaling message and returns a message that includes an "ACCEPT" or a "REJECT" indicator. If the message includes an "ACCEPT" indicator, the access terminal 112 sets the value of the page cycle period to the proposed page cycle period value corresponding to the standalone mode paging cycle attribute. If, however, the message includes a "REJECT" indicator, the access terminal 112 continues to monitor the control channel at the page cycle period that was applicable at the time the power connectivity register bit 234 was flipped. That is, the access terminal 112 leaves the page cycle period value as is. In some examples, the network 100 examines the proposed page cycle period value provided in the signaling message and returns a message that includes an "ALTERNATE" indicator along with a page cycle period value ("alternate page cycle period value") that is different from the proposed page cycle period value. Upon receipt of the message returned from the network 100, the access terminal 112 sets the value of the page cycle period to the alternate page cycle period value and monitors the control channel accordingly.

User Profile Trigger

In some implementations, the 1×EV-DO network 100 of FIG. 1 includes or has access to a user database 122 including user profiles 124 (three of which are illustratively depicted in FIG. 1) for users of access terminals that can communicate with the network. In the illustrated example of FIG. 1, the user database 122 resides on a server 120 that has a connection to the Internet 110. A user can access (e.g., to view or update) his or her profile through any device capable of communicating with the server 120. Examples of such devices include an access terminal 112 in communication with the server 120 through the 1×EV-DO network 110 or a computer 140 having a connection to the Internet 110. In some examples (not shown), the user database 122 resides at the radio node controller 102 itself.

A user profile 124 includes, among other things, information about a user 160 and conditions that specify the manner in which the user's access terminal 112 is to be configured with respect to its page cycle period. Examples of user information include a user role, scheduling information, demographic information, and location information. The conditions can be rule-based (i.e., a particular page cycle period must be selected in order to satisfy the condition), or preference-based (i.e., the selection of a page cycle period depends on a number of factors). In one scenario, the user 160 is a doctor who is either on-duty or off-duty. The user profile 124 can include conditions that specify the page cycle period of the user's access terminal 112 based on the user's on- or off-duty status. In instances in which the user 160 indicates that he is on-duty (e.g., by depressing a pre-programmed shortcut key on a keypad 204 of the access terminal 112), the access terminal 112 sends a signaling message to the network 100 to indicate his "on-duty" status. In some implementations, the signaling message includes a paging cycle attribute value corresponding to the on-duty status. The network 100 retrieves the user's profile 124 from the user database 122, identifies the page cycle period associated with the "on-duty" status for this user 160, and returns a message that includes the "on-duty" page cycle period. Subsequently, the access terminal 112 monitors the control channel in accordance with the on-duty page cycle period. In instances in which the user 160 indicates that he is off-duty (e.g., by depressing the same pre-programmed shortcut key to toggle the status or by depressing a different pre-programmed shortcut key on the keypad 204 of the access terminal 112), the access terminal 112 and the network 100 exchange messages in a manner similar to that described above with reference to the "on-duty" example. In the example scenario above, the access terminal 112 and the network 100 exchange messages responsive to a user input at the access terminal 112 that indicates a change of on- or off-duty status. In other scenarios, the network 100 initiates the changing of the page cycle period of a particular access terminal 112. For example, the conditions provided in a user profile 124 can specify the time, day, week, month, or some combination thereof, when a user 160 is known to be on- or off-duty. Each of those specified times serves as a user profile trigger that causes the network 100 to send a message including the appropriate page cycle period at which the access terminal 112 is to monitor the control channel. The access terminal 112 sets the value of the page cycle period to the identified value provided in the message sent by the network 100 and monitors the control channel in accordance with the newly-set page cycle period.

In some implementations, a user profile 124 is generated based on the results of a questionnaire/survey filled out by the user 160, or an interaction the user 160 has with a customer service representative (not shown) associated with the operator of the network 100. In some implementations, the user 160 is part of a group of users associated with a particular organization that periodically uploads information to the network 100. For example, a hospital can upload information that includes the on- and off-duty schedules for its doctors on a weekly basis. In so doing, no action need be taken by the individual doctors.

Application Trigger

Referring to FIG. 1, in some implementations, the 1×EV-DO radio access network 100 is a Rev-A-capable network that provides and supports premium applications that have different quality of service (QoS) requirements. Such premium applications include Voice over IP (VoIP), push to talk (P2T), video telephony (VT), and instant messaging (IM) applications.

An access terminal 112 that runs a premium application generally requires fast connect times (i.e., short call set-up times) in order to satisfy the QoS requirements of the application and/or meet a user's expectations with regards to application performance. However, the specific needs of different applications may differ. For example, an access terminal 112 running a VT application may need a faster connect time than an access terminal 112 running an IM application. Accordingly, the network 100 may include or have access to an application database 126 that includes, for each premium application, an entry that identifies the corresponding page cycle period with which an access terminal 112 is to monitor a control channel. In the illustrated example of FIG. 1, the application database 126 resides on the server 120. In some examples (not shown), the application database 122 resides at the radio node controller 102 itself.

Suppose, for example, that a user of the access terminal 112 selects an icon displayed on a screen of the access terminal 112 to launch the VT application. In one implementation, this action causes the access terminal 112 to request a specific quality of service for a VT application flow by negotiating ReservationKKQoSRequestFwd/Rev attributes with the network 100. At some point in time after the VT application negotiation and activation has occurred, the network 100 (knowing which premium application uses the entries of the application database 122 to identify an application-specific page cycle period with which the access terminal 112 is to monitor the control channel and notifies the access terminal 112 accordingly. If the access terminal 112 is currently running only one premium application, the page cycle period associated with that application (in this case, the VT application), as provided in the application database 126, is included in the signaling message. If one or more other premium applications are running on the access terminal 112 when the VT application is activated, the network 100 can be implemented to select the shortest page cycle period from among the group of page cycle periods associated with the multiple applications, and send a signaling message including the selected page cycle period to the access terminal 112. The access terminal 112 sets the value of the page cycle period such that it monitors the control channel in accordance with the newly-set application-specific page cycle period.

The network 100 renegotiates the page cycle period each time an access terminal 112 starts or stops running a premium application and sends a signaling message including a page cycle period at which the access terminal 112 is to monitor the control channel until another signaling message is received. In instances in which the single premium application running on the access terminal 112 is terminated, the network 100 sends a signaling message including a default page cycle period at which the access terminal 112 is to monitor the control channel. In instances in which one premium application remains, the network 100 determines whether the access terminal's page cycle period is currently set to that associated with the remaining premium application. If so, no action is taken. Otherwise, the network 100 retrieves the appropriate value from the application database 122 and forwards the retrieved value to the access terminal 112 in a signaling message. In instances in which multiple premium applications remain, the network 100 selects the shortest page cycle period as previously discussed. The access terminal 112 sets the value of the page cycle period such that it monitors the control channel in accordance with the newly-set application-specific page cycle period.

The access terminal 112 may transition between the dormant state and the active state any number of times between receipt of signaling messages. There may be instances in which the transition of the access terminal 112 from the active state to the dormant state coincides with the stopping of a premium application on the access terminal 112 thereby resulting in receipt of a signaling message including a new page cycle period by the access terminal 112. However, there are also instances in which the access terminal 112 simply reverts to monitoring the control channel in accordance with the page cycle period that was set prior to the access terminal 112 transitioning from the dormant state to the active state. Suppose, for example, that at time t=1, the access terminal 112 in the dormant state is running a VT application and monitors the control channel at VT application-specific page cycle period M. At time t=2, the access terminal 112 transitions to the active state. At time t=3, the access terminal 112 transitions back to the dormant state. As the network 100 has not received a signaling message from the access terminal 112 to indicate that the user has stopped the VT application, no page cycle period negotiation takes place and the access terminal reverts to monitoring the control channel at page cycle period M.

Although the examples above describe setting a page cycle period for an access terminal 112 each time a trigger (e.g., application trigger, power connectivity trigger, and user profile trigger) is detected, the network 100 tan be implemented with logic that identifies which triggers are accorded greater weight in selecting an appropriate page cycle period. In other words, detection of a trigger may not result in the changing of the page cycle period if the network 100 determines that the access terminal 112 would be better served with a relatively higher or lower page cycle period.

Although the techniques described above employ the 1×EV-DO air interface standard, the techniques are also applicable to other CDMA and non-CDMA air interface technologies in which slotted mode operation is enabled.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disk or removable disks; magneto-optical disks; and CD-ROM and DVD-ROM disks. The processor and the memory can be supplemented by, or incorporated in special purpose logic circuitry.

Other embodiments are within the scope of the following claims.

What is claimed is:

1. A method performed on a radio network controller, the method comprising:
   determining a frequency with which an access terminal in communication with a radio access network is to monitor a channel of the radio access network based on trigger information received from the access terminal, the triggering information comprising one or more types of triggering information, the one or more types of triggering information relating to all of the following:
      a state of the access terminal;
      a state of a premium application that runs on the access terminal; and
      a user of the access terminal;
   wherein, if the radio network controller receives two or more types of trigger information, the method further comprises:
      identifying which type of trigger information is accorded a greater weight in determining the frequency; and
      causing the access terminal to monitor the channel at a frequency associated with the type of received trigger information having the greater weight.

2. The method of claim 1, wherein causing the access terminal to monitor the channel comprises selecting a page cycle period value based on the trigger information.

3. The method of claim 1, wherein the type of trigger information related to the state of the access terminal comprises information about a power mode of the access terminal.

4. The method of claim 3, wherein the power mode comprises:

a first power mode in which the first access terminal draws power from a first power source; and a second power mode in which the access terminal draws power from a second power source.

5. The method of claim 4, wherein the first power source provides limited power.

6. The method of claim 4, wherein the second power source provides unlimited power.

7. The method of claim 1, wherein the type of trigger information relating to the user of the terminal comprises a user profile identification.

8. The method of claim 7, further comprising:
based on the user profile identification, determining user conditions associated with a page cycle period of the access terminal.

9. The method of claim 8, wherein the user conditions comprise rule-based conditions and preference-based conditions.

10. The method of claim 8, wherein determining user conditions comprises:
retrieving, from a data store, a user profile corresponding to the user profile identification, wherein the user profile comprises one or more of the following: a role of the user, scheduling information, demographic information, and location information.

11. The method of claim 1, wherein the type of trigger information relating to the state of a premium application and comprises information identifying an activation of a premium application on the access terminal.

12. The method of claim 11, wherein the premium application is associated with specific quality of service requirements.

13. The method of claim 1, wherein the type of trigger information relating to the state of the premium application comprises information identifying a termination of a premium application on the access terminal.

14. The method of claim 1, further comprising receiving, from a user of the access terminal, information indicating that the frequency is to be changed, the information being sent to the radio network controller when the user presses a key on the access terminal.

15. The method of claim 14, further comprising:
communicating the information to the radio access network.

16. The method of claim 14, wherein repeated key press toggles the information among two or more different indications.

17. A machine-readable medium that stores executable instructions for use at a radio node controller of a radio access network, the instructions causing a machine to:
determine a frequency with which an access terminal in communication with a radio access network is to monitor a channel of the radio access network based on trigger information received from the access terminal, the triggering information comprising one or more types of triggering information, the one or more types of triggering information relating to all of the following:
a state of the access terminal;
a state of a premium application that runs on the access terminal; and
a user of the terminal;
wherein, if the radio network controller receives two or more types of trigger information, the method further comprises:
identifying which type of trigger information is accorded a greater weight in determining the frequency; and causing the access terminal to monitor the channel at a frequency associated with the type of received trigger information having the greater weight.

18. The machine-readable medium of claim 17, further comprising instructions to cause the machine to:
select a page cycle period value based on the trigger information.

19. The machine-readable medium of claim 17, wherein the trigger information comprises information about one or more of the following: a power mode of the access terminal, a user profile identification, an activation of a premium application on the access terminal, and a termination of a premium application on the access terminal.

20. An apparatus comprising:
a processor, and
memory, including software to provide instructions to the processor to:
determine a frequency with which an access terminal in communication with a radio access network is to monitor a channel of the radio access network based on trigger information received from the access terminal, the triggering information comprising one or more types of triggering information, the one or more types of triggering information relating to all of the following:
a state of the access terminal;
a state of a premium application that runs on the access terminal; and
a user of the terminal;
wherein if the radio network controller receives two or more types of trigger information:
identify which trigger information is accorded greater weight in determining the frequency; and
cause the access terminal to monitor the channel at a frequency associated with the trigger information having the greater weight.

21. The apparatus of claim 20, wherein the instructions to cause the access terminal to monitor the channel further comprise instructions to select a page cycle period value based on the trigger information.

22. The apparatus of claim 20, wherein the trigger information comprises information about one or more of the following: a power mode of the access terminal, a user profile identification, an activation of a premium application on the access terminal, and a termination of a premium application on the terminal.

23. A method performed on a radio network controller, the method comprising:
determining a frequency with which an access terminal in communication with a radio access network is to monitor a channel of the radio access network based on trigger information received from the access terminal that is specific to states of two or more premium applications running on the access terminal; the determining comprising:
identifying a first frequency associated with a first premium application running on the access terminal;
identifying a second frequency associated with a second premium application running on the access terminal;
comparing the first frequency with the second frequency to determine which of the two frequencies is greater; and
causing the access terminal to monitor the channel with the greater of the first frequency and the second frequency.

* * * * *

UNITED STATES PATENT AND TRADEMARK OFFICE
CERTIFICATE OF CORRECTION

PATENT NO. : 7,672,682 B2  
APPLICATION NO. : 11/392230  
DATED : March 2, 2010  
INVENTOR(S) : Vivek Sharma Page 1 of 1

It is certified that error appears in the above-identified patent and that said Letters Patent is hereby corrected as shown below:

On the title page item (57), delete "aces" and insert -- access --, therefor.

Signed and Sealed this

Twenty-seventh Day of April, 2010

David J. Kappos  
*Director of the United States Patent and Trademark Office*